(12) United States Patent
Huebener et al.

(10) Patent No.: US 6,565,696 B1
(45) Date of Patent: May 20, 2003

(54) LAMINATING ADHESIVE HARDENABLE BY RADIATION AND USE OF SAME

(75) Inventors: Achim Huebener, Seevetal (DE); Guenter Henke, Neuss (DE); Michael Drobnik, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/582,244

(22) PCT Filed: Dec. 14, 1998

(86) PCT No.: PCT/EP98/08194

§ 371 (c)(1),
(2), (4) Date: Aug. 24, 2000

(87) PCT Pub. No.: WO99/33931

PCT Pub. Date: Jul. 8, 1999

(30) Foreign Application Priority Data

Dec. 23, 1997 (DE) .......................... 197 57 623

(51) Int. Cl.⁷ .............................. B32B 31/00
(52) U.S. Cl. ................. 156/273.7; 522/31; 522/66
(58) Field of Search ................ 522/66, 31; 156/273.7

(56) References Cited

U.S. PATENT DOCUMENTS

| | | | | |
|---|---|---|---|---|
| 4,108,747 A | * | 8/1978 | Crivello | 522/31 |
| 4,525,232 A | | 6/1985 | Roonery et al. | 156/273.3 |
| 5,486,545 A | * | 1/1996 | Crivello | 522/31 |
| 5,902,837 A | * | 5/1999 | Saito et al. | 522/31 |

FOREIGN PATENT DOCUMENTS

| | | |
|---|---|---|
| DE | 94 20 640.6 | 5/1995 |
| DE | 43 40 949 | 6/1995 |
| EP | 0 447 115 | 9/1991 |
| EP | 0 688 804 | 12/1995 |
| EP | 0 697 449 | 2/1996 |
| JP | 09 040708 | 2/1997 |
| WO | WO93/05124 | 3/1993 |
| WO | WO96/02596 | 2/1996 |

OTHER PUBLICATIONS

Veltex, "Epoxy", Modern Plastics Eucyc; vol. 5, No. 10A, p. 30, Oct. 1974.*

Database WPI, AN97–175718, same as #5, above.

* cited by examiner

Primary Examiner—John J. Gallagher
(74) Attorney, Agent, or Firm—Stephen D. Harper

(57) ABSTRACT

An adhesive containing a) a compound containing at least one vinyl ether group which has a molecular weight of more than 400 and b) a photoinitiator which initiates a polymerization of component A after exposure to light with a wavelength of 100 to 600 nm is useful for the production of a film laminate.

11 Claims, No Drawings

LAMINATING ADHESIVE HARDENABLE BY RADIATION AND USE OF SAME

This invention relates to the use of an adhesive containing at least two components A and B for the production of film laminates. The invention also relates to the use of this radiation-curing laminating adhesive for the production of film laminates.

In the field of adhesives, particularly in the lamination of web-form materials, there is an increasing demand for short cure times and a shorter response time of the adhesives used for lamination. Conventional systems widely available on the market are generally based on polyurethane, acrylate or epoxy binders which cure by relatively slow crosslinking through reaction with added hardener or with moisture. The usual cure time for commercially available systems such as these is about 4 to about 21 days. However, a cure time as long as this to achieve maximal strength of the film laminates is generally not desirable.

Film laminates are exposed in their production, processing and use to a number of stresses which, typically, do not occur with other bonded materials or do not occur to the same extent as they do in film laminates. In the production of film laminates, different—sometimes completely different—materials with, in addition, a different surface structure are bonded to one another. They are generally web-form materials of, for example, paper, plastics, plastics coated by vapor deposition with metals or metal oxides, more particularly transition metals oxides, or metal foils, more particularly aluminium foils.

During their production, processing and use, the film laminates are exposed to a number of mechanical stresses which impose stringent demands on the mechanical properties of the adhesive establishing the bond between the materials. Since the web-form materials to be bonded are normally materials with high flexibility which are constantly exposed to tensile and flexural stresses during production, processing and use, the adhesive itself has to possess sufficiently high flexibility to be able to withstand the stresses occurring without damage or failure of the adhesive bond.

In addition, however, the adhesive is also expected to show high peel strength to be able to withstand tensile stresses applied perpendicularly to the laminate surface without separation of the film laminate.

In addition, the adhesive is also generally expected to satisfy various criteria in regard to crystallization behavior and discoloration which exceed the performance features of adhesives for conventional applications. For example, in the bonding of transparent plastic films, the film laminate is also expected to remain transparent without clouding through crystallization of the adhesive. In addition, the adhesive must not have any tendency to form colored secondary products, even in the event of prolonged storage of the film laminate, for example under UV light.

In addition, film laminates are expected to show high heat resistance after only a short time. This property is particularly important when film laminates are to be used for packaging products while they are still hot, for example with a view to shortening production and filling cycles. However, the feature of heat resistance is also of importance when, for example, materials already at least partly wrapped in the film laminate are to be subjected to heating.

A quality criterion increasing in significance for film laminates is the substantial absence of "migrates". Migrates are understood to be low molecular weight constituents of the film laminate which, on the one hand, are not immobile within the laminate, i.e. are capable of migrating within the laminate, and which on the other hand are capable of diffusing from the laminate into the material wrapped in the laminate. Since low molecular weight constituents such as these can affect the physical health of living beings, more particularly human beings, there is a need to provide substantially migrate-free film laminates.

Components capable of radical polymerization by irradiation in adhesives are known. However, the disadvantage of such radically polymerizing adhesives is that they generally have to be cured under inert conditions because atmospheric oxygen acts as an inhibitor. This is achieved, for example, by irradiating the material to be polymerized in an inert gas atmosphere of, for example, nitrogen or argon. The disadvantage of this procedure is that it can involve significant outlay on equipment to guarantee the necessary inert conditions.

DE-U 94 20 640.6 relates to radiation-curing compositions containing OH-terminated polyurethanes, an epoxy compound and a photoinitiator. The document in question describes a single-stage, radiation-curing adhesive composition which is characterized both by high initial adhesion and by high ultimate adhesion when it is used as a laminating adhesive.

EP-A 0 688 804 describes multicomponent, cationically curing epoxy compositions and a process for curing these compositions. It describes cationically curing epoxy compositions in various embodiments which generally contain as basic constituents a mixture of compounds that form Lewis acids and/or Brönsted acids under irradiation, cationically polymerizable monomers containing epoxy groups and at least one other constituent selected from the group of flexibilizing agents, retarders, radical-polymerizable monomers, accelerators and modifiers. Alcohols and glycols with a molecular weight of at least 200 to 20,000 g/mole are mentioned as flexibilizing agents.

DE-A 43 40 949 describes cationically curing epoxy compositions and their use. This document mentions a photoinitiated, cationically curing epoxy composition which contains at least one retarder, at least one accelerator, at least one ferrocenium complex salt and at least one cycloaliphatic compound containing epoxy groups together with typical auxiliaries and additives.

The adhesives representing the prior art are generally attended by the disadvantage that they do not satisfy all the requirements which an adhesive used for the production of film laminates is expected to meet. Thus, although quick-curing adhesives can be produced from epoxy compounds and polyurethane polyols, their heat resistance is not as good as it should be, for example, for the preparation of foods or the sterilization of medical instruments.

Accordingly, the problem addressed by the present invention was to provide an adhesive system for the production of film laminates which would withstand the severe stressing involved in the production, processing and use of such laminates and which would have a fast cure time and high shear and peel strengths. Another problem addressed by the invention was to provide an adhesive for the production of film laminates with which it would be possible to obtain film laminates characterized by high heat resistance and a minimal content of migrates (low molecular weight polyols).

The problems stated above have been solved by an adhesive containing at least two components A and B which is described in the following.

The present invention relates to the use of an adhesive containing at least two components A and B for the production of a film laminate, a) component A being a compound with at least one vinylether group and a molecular weight of more than 400, b) component B being a photoinitiator which initiates a polymerization of component A after exposure to light with a wavelength of 100 to 600 nm.

The compounds suitable for use as component A in accordance with the present invention have a molecular weight of more than about 400. For example, component A may contain only one compound containing at least one vinyl ester group although a mixture of two or more compounds containing at least one vinyl ether group may equally well be used. By a "mixture" in this context is not meant a mixture of different molecules of a single polymeric compound as generally formed on the basis of the statistical molecular weight distribution in the synthesis of a polymeric compound (depending on the particular synthesis method used). In the present context, the term "mixture" means that at least two polymeric compounds from different synthesis mixtures are mixed. The polymeric compounds may differ, for example, in their molecular weight distribution, i.e. the values for the number average molecular weight ($M_n$) and/or the weight average molecular weight ($M_w$) are different. In general, however, the term "mixture" is understood to be a mixture of at least two different polymeric compounds which have been synthesized, for example, using different monomers.

The polymeric compounds used as component A have a polymer backbone obtained by polycondensation, polyaddition or polymerization or by simultaneous of successive application of the methods mentioned for the synthesis of a polymer.

The compounds suitable for use as component A in accordance with the present invention contain at least one vinyl ether group which is covalently bonded to the polymer chain either terminally, i.e. at the end of a polymer chain, or laterally, i.e. as a side group. A polymer may be attached to a vinyl ether group in various ways, although it has proved to be of advantage in accordance with the present invention if the polymer chain is attached to the vinyl ether group or a vinyl ether group is attached to a polymer chain by at least one OH group present on the polymer chain.

Accordingly, the polymer backbone of the polymeric compounds suitable for use as component A in accordance with the present invention may be, for example, a polyamide, a polyester, a polyether, a polyacrylate, a polymethacrylate, a polycarbonate or a polyurethane or a copolymer containing two or more of the polymer structures mentioned. According to the invention, preferred polymeric compounds are those which contain at least one OH group on the polymer chain before attachment of the vinyl ether group. These include, for example, polybutadienes or polyisoprenes containing terminal OH groups. Processes for the production of OH-containing polymers of the type mentioned above are known to the expert from the relevant literature on macromolecular chemistry and need not be discussed any further here.

The OH-containing polymers may be provided with vinyl ether groups in a particularly simple and advantageous manner. Monohydroxy-vinyl ethers obtainable, for example, by reacting acetylene with a polyol, preferably a diol, are normally used as starting material for this purpose. The monohydroxyvinyl ethers may be reacted, for example, with a polyisocyanate, the stoichiometric ratio of the monohydroxyvinyl ether to the polyisocyanate having to be selected so that at least one free isocyanate group per molecule is left on completion of the reaction. The compound thus obtained may be reacted with the polymeric compound containing OH groups, resulting in a compound containing covalently bonded vinyl ether groups.

The reverse procedure is also possible, i.e. the polymer containing OH groups is first reacted with a polyisocyanate so that a polymer containing isocyanate groups is formed and is then reacted with a monohydroxyvinyl ether.

Polymers produced in this way contain a terminal or lateral urethane group. Accordingly, the term "polyurethanes" used in the present specification also encompasses all those polymeric compounds which are attached by a urethane group to a vinyl ether group in the manner described above.

In one particularly preferred embodiment, the polyurethane preferably used as component A in accordance with the present invention is a polyester or polyether polyurethane.

A polyester polyurethane particularly preferred as component A in accordance with the present invention may be obtained from the reaction of a polyester polyol with a polyisocyanate and a monohydroxyvinyl ether.

Polyester polyols with a molecular weight of about 200 to about 10,000 are suitable for the production of component A. For example, it is possible to use polyester polyols obtained by reacting low molecular weight alcohols, more particularly ethylene glycol, diethylene glycol, neopentyl glycol, hexanediol, butanediol, propylene glycol, glycerol or trimethylol propane, with caprolactone. Also suitable as polyhydric alcohols for the production of polyester polyols are 1,4-hydroxymethyl cyclohexane, 2-methylpropane-1,3-diol, 1,2,4-butanetriol, triethylene glycol, tetraethylene glycol, polyethylene glycol, dipropylene glycol, polypropylene glycol, dibutylene glycol and polybutylene glycol. Mixtures of two or more of the alcohols mentioned are also suitable for the production of component A.

Other suitable polyester polyols are obtainable by polycondensation. Thus, dihydric and/or trihydric alcohols may be condensed with less than the equivalent quantity of dicarboxylic acids and/or tricarboxylic acids or reactive derivatives thereof to form polyester polyols. Suitable dicarboxylic acids are, for example, succinic acid and higher homologs thereof containing up to about 16 carbon atoms, unsaturated dicarboxylic acids, such as maleic acid or fumaric acid, and aromatic dicarboxylic acids, more particularly isomeric phthalic acids, such as phthalic acid, isophthalic acid or terephthalic acid or mixtures of two or more of the dicarboxylic acids mentioned. Suitable tricarboxylic acids are, for example, citric acid and trimellitic acid. According to the invention, polyester polyols of at least one of the dicarboxylic acids mentioned and glycerol, which have a residual content of OH groups, are particularly suitable. Particularly suitable alcohols are hexane diol, ethylene glycol, diethylene glycol or neopentyl glycol or mixtures of two or more thereof. Particularly suitable acids are isophthalic acid and adipic acid or mixtures thereof.

Polyester polyols of high molecular weight include, for example, the reaction products of polyhydric, preferably dihydric alcohols (optionally together with small quantities of trihydric alcohols) and polybasic, preferably dibasic carboxylic acids. Instead of free polycarboxylic acids, the corresponding polycarboxylic anhydrides or corresponding polycarboxylic acid esters with alcohols preferably containing 1 to 3 carbon atoms may also be used (where possible). The polycarboxylic acids may be aliphatic, cycloaliphatic, aromatic and/or heterocyclic. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acid or trimer fatty acid or mixtures of two or more thereof. Small quantities of monofunctional fatty acids may optionally be present in the reaction mixture.

If a polyether polyurethane is to be used as component A, the basic polyether may be, for example, a reaction product of low molecular weight polyhydric alcohols with alkylene oxides. The alkylene oxides preferably contain 2 to about 4 carbon atoms. Suitable reaction products are, for example, the reaction products of ethylene glycol, propylene glycol, the isomeric butane diols or hexane diols with ethylene oxide, propylene oxide and/or butylene oxide. Other suitable reaction products are the reaction products of polyhydric alcohols, such as glycerol, trimethylol ethane and/or trimethylol propane, pentaerythritol or sugar alcohols, with the alkylene oxides mentioned to form polyether polyols. Polyether polyols with a molecular weight of about 100 to about 10,000 and preferably in the range from about 200 to about 5000 are particularly suitable. Polypropylene glycol with a molecular weight of about 300 to about 2500 is most particularly preferred for the purposes of the present invention. Other suitable polyol components for the production of component A are the polyether polyols formed, for example, from the polymerization of tetrahydrofuran.

The polyethers are obtained in known manner by reacting the starting compound containing at least one reactive hydrogen atom with alkylene oxides, for example ethylene oxide, propylene oxide, butylene oxide, styrene oxide, tetrahydrofuran or epichlorohydrin or mixtures of two or more thereof.

Suitable starter compounds are, for example, water, ethylene glycol, 1,2- or 1,3-propylene glycol, 1,4- or 1,3-butylene glycol, hexane-1,6-diol, octane-1,8-diol, neopentyl glycol, 1,4-hydroxymethyl cyclohexane, 2-methyl propane-1,3-diol, glycerol, trimethylol propane, hexane-1,2,6-triol, butane 1,2,4-triol, trimethylol ethane, pentaerythritol, mannitol, sorbitol, methyl glycosides, sugars, phenol, isononyl phenol, resorcinol, hydroquinone, 1,2,2- or 1,1,2-tris-(hydroxyphenyl)-ethane, ammonia, methyl amine, ethylenediamine, tetra- or hexamethylenediamine, triethanolamine, aniline, phenylene diamine, 2,4- and 2,6-diaminotoluene and polyphenyl polymethylene polyamines obtainable by condensing aniline and formaldehyde.

Polyethers modified by polymers are also suitable for use as the polyol component. Products such as these are obtainable, for example, by polymerizing styrene, acrylonitrile, vinyl acetate, acrylates or methacrylates or mixtures of two or more thereof in the presence of polyethers.

Suitable polyisocyanates for the production of component A are, for example, ethylene diisocyanate, 1,4-tetramethylene diisocyanate, 1,6-hexamethylene diisocyanate (HDI), cyclobutane-1,3-diisocyanate, cyclohexyl-1,3- and -1,4-diisocyanate and mixtures of two or more thereof, 1-isocyanato-3,3,5-trimethyl-5-isocyanatomethyl cyclohexane (isophorone diisocyanate, IPDI), 2,4- and 2,6-hexahydrotoluene diisocyanate, hexahydro-1,3- or 1,4-phenylene diisocyanate, tetramethyl xylylene diisocyanate (TMXDI), 1,3- and 1,4-phenylene diisocyanate, 2,4- or 2,6-toluene diisocyanate, diphenylmethane-2,4'-diisocyanate, diphenylmethane-2,2'-diisocyanate or diphenylmethane-4,4'-diisocyanate or mixtures of two or more of the diisocyanates mentioned.

According to the invention, other polyisocyanates suitable for the production of component A are trifunctional or higher isocyanates obtainable, for example, by oligomerization of diisocyanates. Examples of such polyisocyanates with a functionality of 3 or more are the triisocyanurates of HDI or IPDI or mixtures thereof or mixed triisocyanurates thereof.

Suitable monohydroxyvinyl ethers are any monohydric alcohols which contain at least one vinyl ether group in the molecule. More particularly, such monohydric alcohols are compounds corresponding to general formula (I):

$$R^1\text{—}CH\text{=}CR^2\text{—}O\text{—}Z\text{—}OH \tag{I}$$

in which $R^1$ and $R^2$ independently of one another represent hydrogen and/or $C_{1-10}$ alkyl groups, but preferably $C_{1-4}$ alkyl groups. One of the two substituents is preferably hydrogen because otherwise there is a generally unwanted reduction in the polymerization rate of component A. In one preferred embodiment, $R^1$ is a methyl group and $R^2$ is hydrogen. In one particularly preferred embodiment, $R^1$ and $R^2$ are both hydrogen. Z is a difunctional radical derived from dihydric alcohols. For example, Z may be a difunctional radical derived from the group of linear diols, for example ethylene glycol, 1,3-propylene glycol, 1,4-butylene glycol. Z may also be derived from the group of branched diols, such as 1,2-propylene glycol or 2,3-butylene glycol, or from the group of polyalkylene glycols, for example diethylene glycol, triethylene glycol and higher homologs thereof.

Particularly preferred monohydroxyvinyl ethers are 4-hydroxybutyl vinyl ether, 4-hydroxymethyl cyclohexyl methyl vinyl ether, 2-hydroxyethyl vinyl ether, triethylene glycol monovinyl ether or diethylene glycol monovinyl ether or mixtures of two or more thereof.

The adhesive to be used in accordance with the invention contains a photoinitiator or a mixture of two or more photoinitiators as component B. The photoinitiator is capable of initiating the polymerization of the vinyl ether groups under the effect of radiation. Photoinitiators which produce Lewis acids or Brönstedt acids under the effect of electromagnetic radiation, more particularly under the effect of light, are particularly suitable for this purpose.

According to the invention, complex onium compounds or ferrocene complex salts are preferably used as the photoinitiators which produce Lewis acids and/or Brönsted acids under the effect of light. Basically, any photosensitive aromatic sulfonium or iodonium salts are suitable for the light-induced initiation of the polymerization reaction. The trisaryl sulfonium hexafluoroantimonates, the trisaryl sulfonium hexafluorophosphates present, for example, in the commercial products Cyracure® UVI-6974 and UVI6990 (products of UCC, Danbury, UK) and bis-(4,4'-dimethylbenzyl)iodonium tetra-(pentafluorophenyl)-borate (UV CATA 200, a product of Rhone-Poulenc, Saint-Fons, France) are particularly suitable.

In one particularly preferred embodiment of the present invention, component B is a photoinitiator selected from the group consisting of triaryl sulfonium complex salts, diaryl iodonium complex salts or ferrocene complex salts or mixtures of two or more thereof.

The photoinitiator used in accordance with the present invention is capable of initiating a polymerization of component A after exposure to light with a wavelength of about 100 to about 600 nm. In one preferred embodiment of the invention, the polymerization is initiated by exposure to light with a wavelength of about 150 to about 500 nm, for example in the range from about 200 to about 480 nm.

The adhesive to be used in accordance with the invention may optionally contain c) a compound containing at least one vinyl ether group with a molecular weight of less than about 400 as component C.

It may be desirable to reduce the viscosity of the adhesive to be used in accordance with the invention without having to resort to solvents that are difficult to remove. In these cases, it is appropriate to add a compound containing at least one vinyl ether group with a molecular weight of less than about 400 as component C to the adhesive to be used in accordance with the invention. While component C provides for a low viscosity of the adhesive, it is generally completely or at least substantially completely incorporated in the crosslinked polymer during curing in accordance with the concept of a "reactive thinner".

If only a diluting effect is to be obtained, it is sufficient to use a compound or a mixture of two or more compounds containing only one vinyl ether group as component C. However, if the crosslinking of the adhesive is to be influenced by component C, it is of advantage if component C at least partly contains a compound with at least two vinyl ether groups or a mixture of two or more such compounds as "crosslinker".

The following compounds, for example, are suitable for use as component C in the adhesives to be used in accordance with the invention: hydroxybutyl vinyl ether, triethylene glycol divinyl ether, cyclohexane dimethanol divinyl ether, propylene ethers of propylene carbonate (for example Rapi-Cure® PEPC, ISP Europe), dodecyl vinyl ether, cyclohexane dimethanol monovinyl ether, cyclohexyl vinyl ether, diethylene glycol divinyl ether, 2-ethylhexyl vinyl ether, dipropylene glycol divinyl ether, tripropylene glycol divinyl ether, hexane diol divinyl ether, octadecyl vinyl ether, butane diol divinyl ether, glycerol trivinyl ether, trimethylol propane trivinyl ether, pentaerythritol tetravinyl ether or higher vinyl ethers of higher alcohols or mixtures of two or more thereof.

The adhesive to be used in accordance with the invention may optionally contain d) a compound containing at least two OH groups as component D.

Component D may also participate in the polymerization of component A—comparably to the behavior of component C—and may be incorporated in the crosslinked adhesive. Accordingly, component D on the one hand may act as a "reactive thinner" for reducing the viscosity of the adhesive and, on the other hand, may also act as a "crosslinker".

OH-containing compounds suitable for this purpose are, for example, ethylene glycol, diethylene glycol, neopentyl glycol, hexane diol, butane diol, propylene glycol, glycerol, trimethylol propane, pentaerythritol or sugar alcohols or a mixture of two or more thereof and oligomeric ethers of the individual compounds mentioned or oligomeric ethers of a mixture of two or more of the compounds mentioned with one another. For example, reaction products of polyhydric alcohols, such as glycerol, trimethylol ethane and/or trimethylol propane, pentaerythritol or sugar alcohols with the alkylene oxides mentioned to form oligoether polyols with a molecular weight of up to about 16,000, are suitable.

Also suitable for use as component D are relatively high molecular weight compounds, for example polyester polyols, polyether polyols, polyurethane polyols, polycarbonate polyols, polyvinyl acetate polyols, polyacrylate polyols, polymethacrylate polyols and copolyols or suitable acrylates and methacrylates or mixtures of two or more of the polyols mentioned.

The compounds used as component D preferably have a molecular weight of up to about 10,000 and, more preferably, about 5000 to about 6000.

In one particularly preferred embodiment of the present invention, polyester polyols, polyether polyols or polyurethane polyols are used as component D.

The polyester polyols suitable as component D are preferably polyesters with a molecular weight ($M_n$) of more than about 400 to about 10,000. Preferred polyester polyols are prepared, for example, by reaction of low molecular weight alcohols, more particularly ethylene glycol, diethylene glycol, neopentyl glycol, hexanediol, butanediol, propylene glycol, glycerol or trimethylol propane, by polycondensation with a polycarboxylic acid or a mixture of two or more such acids. For example, dihydric and/or trihydric alcohols may be condensed with dicarboxylic acids and/or tricarboxylic acids or reactive derivatives thereof to form polyesters. Suitable dicarboxylic acids are, for example, succinic acid and higher homologs thereof containing up to 16 carbon atoms, unsaturated dicarboxylic acids, such as maleic acid or fumaric acid, and aromatic dicarboxylic acids, more particularly the isomeric phthalic acids, such as phthalic acid, isophthalic acid or terephthalic acid. Suitable tricarboxylic acids are, for example, citric acid and trimellitic acid. Also suitable are aliphatic polycarboxylic acids, such as adipic acid, glutamic acid, pimelic acid, aromatic acids, such as naphthalene dicarboxylic acid, cycloalkyl acids, such as cyclohexane dicarboxylic acid, or acids containing hetero atoms, such as S or N, for example diglycolic acid, ethylether-2,2-dicarboxylic acid or thiodiglycolic acid.

Other polyols suitable for the production of the polyesters are aliphatic alcohols containing two to four OH groups per molecule. The OH groups are preferably primary, but may also be secondary. Suitable aliphatic alcohols include, for example, ethylene glycol, propylene glycol, butane-1,4-diol, pentane-1,5-diol, hexane-1,6-diol, heptane-1,7-diol, octane-1,8-diol and higher homologs and isomers thereof which can be obtained by the expert by extension of the hydrocarbon chain by one $CH_2$ group at a time or by introduction of branches into the carbon chain. Also suitable are higher alcohols, for example glycerol, trimethylol propane, pentaerythritol and oligomeric ethers of the substances mentioned either as such or in the form of mixtures of two or more of the ethers mentioned with one another.

In addition, the reaction products of low molecular weight polyhydric alcohols with alkylene oxides containing up to 4 carbon atoms may also be used as the polyol component for producing the polyesters. Suitable reaction products are, for example, reaction products of ethylene glycol, propylene glycol, the isomeric butane diols or hexane diols with ethylene oxide, propylene oxide and/or butylene oxide. The reaction products of polyhydric alcohols, such as glycerol, trimethylol ethane and/or trimethylol propane, pentaerythritol, or sugar alcohols with the alkylene oxides mentioned to form polyether polyols are also suitable. In addition, the reaction products of low molecular weight polyhydric alcohols with alkylene oxides containing up to 4 carbon atoms may also be used as the polyol component for producing the polyesters. Suitable reaction products are, for example, reaction products of ethylene glycol, propylene glycol, the isomeric butane diols or hexane diols, with ethylene oxide, propylene oxide and/or butylene oxide. The reaction products of polyhydric alcohols, such as glycerol, trimethylol ethane and/or trimethylol propane, pentaerythritol or sugar alcohols, with the alkylene oxides mentioned to form polyether polyols are also suitable. Particularly suitable polyols for producing the polyesters are polyether polyols with a molecular weight of about 100 to 5000 and preferably in the range from about 200 to about 3000. Propylene glycol with a molecular weight of about 300 to about 2500 is most particularly preferred for the purposes of the present invention. Polyether polyols obtained, for example, by the polymerization of tetrahydrofuran are also suitable.

A group of polymers preferably used as component D in accordance with the present invention are the polyurethane polyols. In the context of the present invention, polyurethane polyols are understood to be compounds obtainable by polyaddition of dihydric and/or higher alcohols and polyisocyanates. Polyesters and/or polyethers with a molecular weight of about 300 to 10,000 and preferably in the range from about 800 to about 5000 containing at least two hydroxy groups are typically selected as polyols for the production of the polyurethanes. Polyesters suitable for the production of the polyurethanes usable in accordance with the present invention are any OH-terminated polyesters which can be chain-extended by reaction with an at least difunctional isocyanate. These include, for example, the polyesters mentioned above.

Other dihydroxy compounds which may be used for the preparation of the polyesters suitable for use as polyol component for producing the polyurethanes are, for example, butane-1,3-diol, butane-1,4-diol, butane-2,3-diol, 2,2-diethylpropane-1,3-diol, 2-methyl-2-propylpropane-1, 3-diol, isomeric octane diols, ethylenically unsaturated difunctional compounds, such as heptene diol, octene diol, and difunctional compounds containing N or S hetero atoms, for example diethylene glycol, triethylene glycol, thioethylene glycol, diethanolamine or N-methyl diethanolamine or mixtures of two or more thereof.

To produce the polyurethanes, the diols are generally reacted with corresponding, at least difunctional isocyanates. The isocyanates used in accordance with the present invention may be aliphatic or aromatic and may contain about 4 to about 40 carbon atoms. Examples of suitable isocyanates are hexamethylene diisocyanate (HDI), 1,8-octane diisocyanate, 1,10-decane diisocyanate, diisocyanates obtainable, for example, from the dimerization of fatty acids and corresponding subsequent functionalization, 1,4-phenylene diisocyanate, 2,4- and 2,6-toluene diisocyanate and mixtures thereof, 1,5-naphthylene diisocyanate, 2,2'-, 2,4'- or 4,4'-diphenyl methane diisocyanate (MDI) or mixtures of two or more thereof, tetramethyl xylylene diisocyanate (TMXDI), isophorone diisocyanate (IPDI), cyclobutane-1,3-diisocyanate, cyclohexane-1,3- and -1,4-diisocyanate, 2,4- and 2,6-hexahydrotoluene diisocyanate, hexahydro-1,3- or -1,4-phenylene diisocyanate, 2,2'-diphenyl methane diisocyanate or 4,4'-diphenyl methane diisocyanate or mixtures of two or more of the diisocyanates mentioned. Other suitable isocyanates for producing the polyurethane present in component A are trifunctional or higher polyisocyanates obtainable, for example, by oligomerization of diisocyanates. Examples of such trifunctional and higher polyisocyanates are the triisocyanurates of HDI or IPDI or mixed triisocyanurates thereof.

In general, the average molecular weight of the polymers used as component D should not be any lower than 400. Since polymers generally have a statistical molecular weight distribution depending on the particular method selected for their synthesis, the expression "average molecular weight" relates to the number average ($M_n$) of the molecular weight of the polymers present in component A. This allows for the fact that individual polymeric molecules of which the molecular weight is below the value of 400 mentioned may also be present.

The adhesive to be used in accordance with the invention may optionally contain
  e) a compound containing at least one epoxy group as component E.

Compounds containing at least one epoxy group suitable for use as component E in accordance with the present invention include, for example, the cycloaliphatic epoxides. Examples of cycloaliphatic epoxides are bis-(3,4-epoxycyclohexylmethyl)-oxalate, bis-(3,4-epoxycyclohexyl-methyl)-adipate, bis-(3,4-epoxy-6-methylcyclohexylmethyl)-adipate and/or bis-(3,4-epoxycyclohexylmethyl)-pimelate.

Also suitable are 3,4-epoxycyclohexylmethyl-3,4-epoxycyclohexane carboxylates, for example 3,4-epoxycyclohexylmethyl-3,4-epoxycyclohexane carboxylic acid, 3,4-epoxy-1-methylcyclohexylmethyl-3,4-epoxy-1-methylcyclohexane carboxylic acid, 6-methyl-3,4-epoxycyclohexylmethyl-6-methyl-3,4-epoxycyclohexane carboxylic acid, 3,4-epoxy-2-methylcyclomethyl-3,4-epoxy-2-methylcyclohexane carboxylic acid, 3,4-epoxy-5-methylcyclohexylmethyl-3,4-epoxy-5-methylcyclohexane carboxylic acid and the like.

Other epoxides suitable for use in accordance with the invention are glycidyl ethers obtainable from polyhydric phenols, for example diglycidyl ethers of 2,2'-bis-(2,3-epoxypropoxyphenol)-propane.

Component E generally contains at least about 5% by weight of a compound containing only one epoxy group. Accordingly, the percentage content of compounds containing two or more epoxy groups is about 5 to about 50% by weight, the percentage content of epoxides with a functionality of 3 or more being about 5 to about 30% by weight.

In addition to components A, B, C, D and E, the adhesive to be used in accordance with the invention may contain as component F at least one compound or a mixture of two or more compounds containing a cationically polymerizable functional group which is not a vinyl ether group and not an epoxy group. Examples of such compounds are olefins, vinyl arenes, more particularly styrene, and heterocyclic compounds, such as ethers, thioethers, esters or acetals. According to the invention, styrene is preferred.

The adhesives to be used in accordance with the invention may additionally contain additives including, for example, accelerators, dyes, pigments, fillers, reinforcing agents, thixotropicizing agents, initiators, stabilizers, inhibitors and coupling agents. Accelerators are generally used to accelerate the polymerization reaction. This can be done either by accelerating the initiation reaction taking place under the influence of radiation or by supporting the polymerization reaction itself, i.e. the addition of the individual monomers onto one another.

The adhesive to be used in accordance with the invention may contain components A, B and optionally C, D, E and/or F and any additives present in various quantities. All the quantities shown are based on the adhesive as a whole.

Component A generally makes up about 1% by weight to about 99.9% by weight and preferably about 1% by weight to about 99% by weight of the adhesive.

Component B is generally used in a quantity of about 0.1 to about 8% by weight in the adhesive, preferably in a quantity of about 1% by weight to about 5% by weight and more preferably in a quantity of about 2% by weight to about 4% by weight.

Component C is optionally used in a quantity of up to about 40% by weight in the adhesive and preferably in a quantity of about 5% by weight to about 30% by weight.

Component D is optionally used in a quantity of up to about 40% by weight in the adhesive and preferably in a quantity of about 5% by weight to about 20% by weight.

Component E is optionally used in a quantity of up to about 40% by weight in the adhesive and preferably in a quantity of about 10% by weight to about 30% by weight.

Component F is optionally used in a quantity of up to about 40% by weight in the adhesive and preferably in a quantity of about 10% by weight to about 30% by weight.

The additives optionally present in the adhesive to be used in accordance with the invention may be used in a total quantity of up to about 20% by weight.

In one preferred embodiment of the invention, an adhesive containing about 10 to 96% by weight of component A, 2 to 4% by weight component B and 2 to 30% by weight of component C is used.

The present invention also relates to an adhesive containing three components A, B and D, a) component A being a polymeric compound with at least one vinyl ether group and a molecular weight of more than 400, b) component B being a photoinitiator which initiates a polymerization of component A after exposure to light with a wavelength of 100 to 600 nm and d) component D being a compound containing at least two OH groups.

In another preferred embodiment, the adhesive according to the invention contains about 50 to 80% by weight of component A, 2 to 4% by weight of component B and 18 to 46% by weight of component D.

The adhesive may optionally contain at least one other component selected from components C, E and F and the additives defined in the foregoing.

The adhesive composition according to the invention is normally prepared by mixing the components mentioned. The resulting mixture may be applied to the films to be bonded by machines normally used for such purposes, for example by conventional laminating machines. Application of the adhesives in liquid form to a film to be bonded to form a laminate is particularly suitable. The film thus coated with adhesive is then combined with another film by known techniques and transferred to an irradiation zone where the polymerization reaction, i.e. the crosslinking of the individual adhesive components, is initiated by exposure to ultraviolet radiation. The adhesive-coated film generally may also be irradiated before the adhesive-coated surface is bonded to a second film. This procedure presupposes that the adhesive-coated film is applied to the second film at a time when the polymerization of the adhesive, i.e. the curing process, is still not complete. The adhesive must be capable of developing sufficient adhesion at that time for the second web to adhere. This procedure is advisable in particular when two films that are not permeable to the radiation required to initiate polymerization are to be bonded to one another.

The described bonding and laminating process may be repeated several times so that laminates consisting of more than two bonded layers can be produced.

The bondable materials include, for example, paper, cellulose hydrate, plastics, such as polyethylene, polypropylene, polyethylene terephthalate, polyvinyl chloride, copolymers of vinyl chloride and vinylidene chloride, copolymers of vinyl acetate olefins, polyamides, or metal foils, for example of aluminium, lead or copper.

What is claimed is:

1. A method of producing a film laminate, comprising the steps of:

providing an adhesive composition between a first film and a second film, the adhesive containing at least three components, A, B and D, component A being a compound containing at least one vinyl ether group which has a molecular weight of more than 400, component B being a photoinitiator which initiates a polymerization of component A after exposure to light with a wavelength of 100 to 600 nm and a saturated compound containing at least two OH groups as component D, the saturated compound being selected from the group consisting of polyester polyols, polycarbonate polyols, polyacetal polyols, polyvinyl acetate polyols, polyacrylate polyols, polymethacrylate polyols, copolyols of acrylates and methacrylates, polyurethane polyols, reaction products of polyhydric alcohols and alkylene oxides, ethylene glycol, diethylene glycol, neopentyl glycol, hexane diol, butane diol, propylene glycol, glycerol, triethylol propane, trimethylol propane, pentaerythritol, sugar alcohols, oligomeric ethers of one or more compounds selected from the group consisting of ethylene glycol, diethylene glycol, neopentyl glycol, hexane diol, butane diol, propylene glycol, glycerol, triethylol propane, trimethylolpropane, pentaerythritol, or sugar alcohols, and mixtures thereof; and exposing the adhesive to light.

2. The method of claim 1 wherein the adhesive comprises a photoinitiator selected from the group consisting of triaryl sulfonium complex salts, diaryl iodonium complex salts and ferrocene complex salts.

3. The method of claim 1 wherein the adhesive further comprises a compound with at least one vinyl ether group and a molecular weight of less than 400 as component C.

4. The method of claim 1 wherein component D comprises an at least trihydric alcohol or a mixture of two or more trihydric alcohols with a molecular weight of less than 400.

5. The method of claim 1 wherein the adhesive further comprises a compound with at least one epoxy group as component E.

6. The method of claim 1 wherein the adhesive contains 50 to 80% by weight of component A, 2 to 4% by weight of component B and 18 to 46% by weight of component D.

7. The method of claim 1 wherein the adhesive further comprises a compound with at least one vinyl ether group and a molecular weight of less than 400 as component C; and a compound with at least one epoxy group as component E.

8. An adhesive composition comprising:

a compound with at least one vinyl ether group and a molecular weight of more than 400 as component A, a photoinitiator as component B which initiates polymerization of component A after exposure to light with a wavelength of 100 to 600 nm, and a saturated compound containing at least two OH groups as component C, the saturated compound being selected from the group consisting of polyester polyols, polycarbonate polyols, polyacetal polyols, polyvinyl acetate polyols, polyacrylate polyols, polymethacrylate polyols, copolyols of acrylates and methacrylates, polyurethane polyols, reaction products of polyhydric alcohols and alkylene oxides, ethylene glycol, diethylene glycol, neopentyl glycol, hexane diol, butane diol, propylene glycol, glycerol, triethylol propane, trimethylol propane, pentaerythritol, sugar alcohols, oligomeric ethers of one or more compounds selected from the group consisting of ethylene glycol, diethylene glycol, neopentyl glycol, hexane diol, butane diol, propylene glycol, glycerol, triethylol propane, trimethylolpropane, pentaerythritol, or sugar alcohols, and mixtures thereof.

9. The adhesive composition of claim 8 further comprising a compound with at least one vinyl ether group and a molecular weight of less than 400.

10. The adhesive composition of claim 8 further comprising a component with at least one epoxy group.

11. The adhesive composition of claim 10 wherein the adhesive contains 50 to 80% by weight of component a), 2 to 4% by weight of component b) and 18 to 46% by weight of component c).

* * * * *

UNITED STATES PATENT AND TRADEMARK OFFICE
CERTIFICATE OF CORRECTION

PATENT NO. : 6,565,696 B1
DATED : May 20, 2003
INVENTOR(S) : Huebener et al.

It is certified that error appears in the above-identified patent and that said Letters Patent is hereby corrected as shown below:

<u>Title page,</u>
Item [56], References Cited, OTHER PUBLICATIONS, delete the first reference and insert therefore -- Velten, "Epoxy", Modern Plastics Encyc., vol. 51, No. 10A, p. 30, Oct. 1974.* --.
Delete the second reference and insert therefore -- Database WPI, Class A14, AN97-175718 --.

<u>Column 14,</u>
Line 6, delete "claim 10", and insert therefore -- claim 8 --.

Signed and Sealed this

Second Day of November, 2004

JON W. DUDAS
*Director of the United States Patent and Trademark Office*